United States Patent
Sankey et al.

(10) Patent No.: US 12,378,352 B2
(45) Date of Patent: Aug. 5, 2025

(54) COPOLYESTERS AND PROCESSES FOR PREPARING COPOLYESTERS SUITABLE FOR USE IN FOOD CONTACT APPLICATIONS

(71) Applicant: Mylar Specialty Films U.S. Limited Partnership, Chester, VA (US)

(72) Inventors: Stephen Sankey, Wilton (GB); Stephen Jones, Wilton (GB); David Turner, Wilton (GB)

(73) Assignee: Mylar Specialty Films U.S. Limited Partnership, Chester, VA (US)

( * ) Notice: Subject to any disclaimer, the term of this patent is extended or adjusted under 35 U.S.C. 154(b) by 778 days.

(21) Appl. No.: 17/604,034

(22) PCT Filed: Apr. 20, 2020

(86) PCT No.: PCT/GB2020/050984
§ 371 (c)(1),
(2) Date: Oct. 15, 2021

(87) PCT Pub. No.: WO2020/212714
PCT Pub. Date: Oct. 22, 2020

(65) Prior Publication Data
US 2022/0204688 A1 Jun. 30, 2022

(30) Foreign Application Priority Data
Apr. 18, 2019 (GB) ..................... 1905587

(51) Int. Cl.
*C08G 63/183* (2006.01)
*C08G 63/78* (2006.01)

(52) U.S. Cl.
CPC .......... *C08G 63/183* (2013.01); *C08G 63/78* (2013.01)

(58) Field of Classification Search
CPC .............................. C08G 63/183; C08G 63/78
USPC ......................................................... 528/302
See application file for complete search history.

(56) References Cited

U.S. PATENT DOCUMENTS

| 6,399,716 B2 | 6/2002 | Chung et al. |
| 8,415,011 B2 | 4/2013 | Sankey et al. |
| 2001/0004665 A1* | 6/2001 | Chung ............... C08G 63/78 528/308 |
| 2004/0209094 A1 | 10/2004 | MacKerron |
| 2006/0155099 A1 | 7/2006 | Wu et al. |

(Continued)

FOREIGN PATENT DOCUMENTS

JP H11-21341 A 1/1999

OTHER PUBLICATIONS

Papageorgiou et al "Synthesis, Crystallization, and Enzymatic Degradation of the Biodegradable Polyester Poly( ethylene azelate)", Macromol.Chem.Phys.2010,211,2585-2595 (Year: 2010).*

(Continued)

*Primary Examiner* — Ling Siu Cho
*Assistant Examiner* — Ronald Grinsted
(74) *Attorney, Agent, or Firm* — Wolf, Greenfield & Sacks, P.C.

(57) ABSTRACT

A process for preparing a copolyester comprising repeating units derived from (i) at least one aliphatic glycol, (ii) at least one aromatic dicarboxylic acid, and (iii) at least one aliphatic dicarboxylic acid, wherein the aliphatic dicarboxylic acid constitutes a proportion of the acid fraction of the copolyester.

29 Claims, 1 Drawing Sheet

(56) References Cited

U.S. PATENT DOCUMENTS

Figure 1:
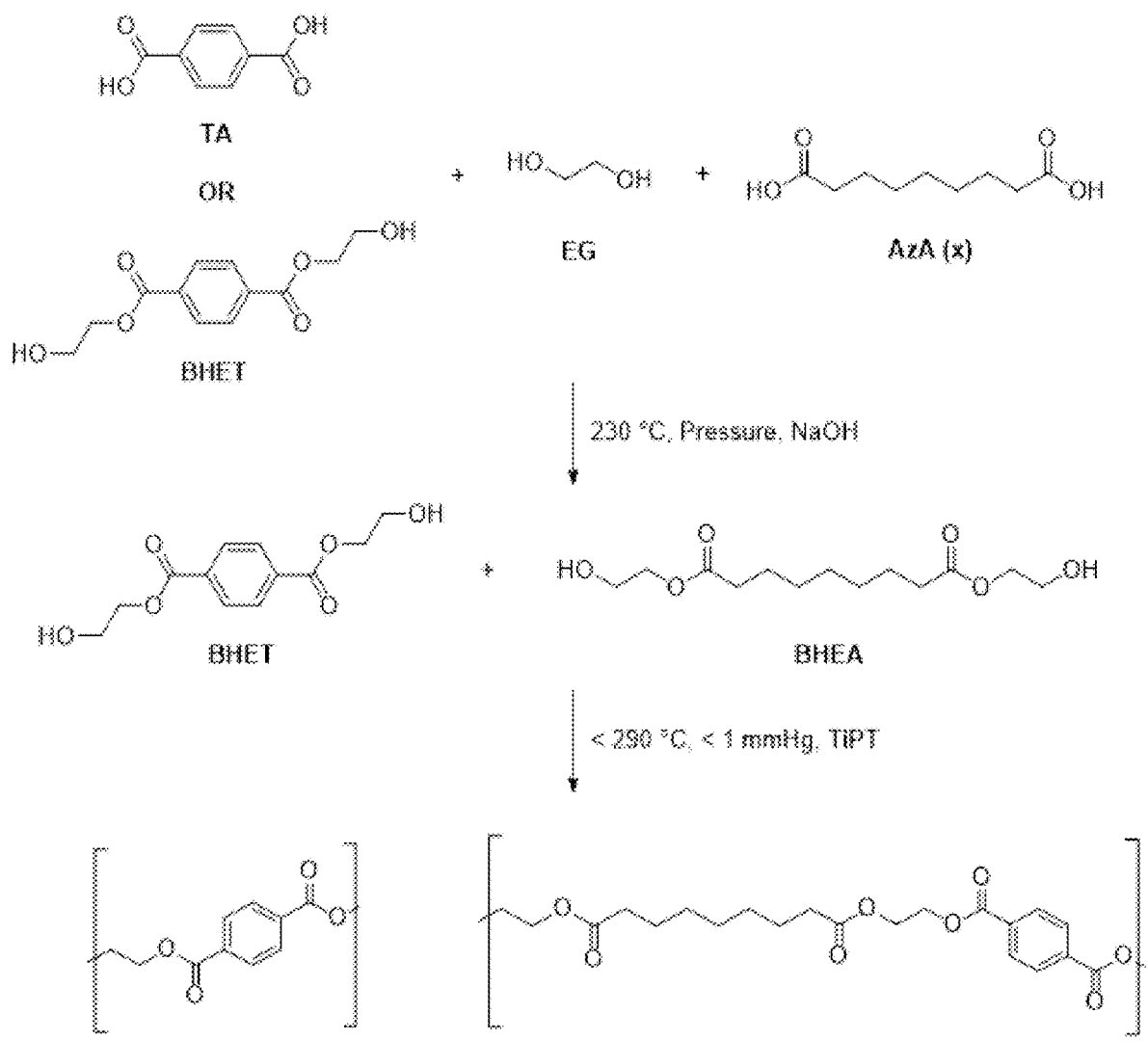

| | | |
|---|---|---|
| 2010/0003377 A1 | 1/2010 | Brennan et al. |
| 2011/0039999 A1* | 2/2011 | Witt ................. C08G 18/73 524/879 |
| 2011/0187029 A1* | 8/2011 | Dietrich ............. C08G 63/916 525/130 |
| 2012/0220680 A1* | 8/2012 | Bastioli ............. C08L 67/02 524/21 |
| 2013/0299374 A1 | 11/2013 | Sankey et al. |
| 2014/0128514 A1* | 5/2014 | Witt ................. C08G 18/4241 524/35 |
| 2015/0183927 A1* | 7/2015 | Kang ................. C08G 63/78 528/302 |
| 2018/0257842 A1 | 9/2018 | Deng et al. |

OTHER PUBLICATIONS

Kong et al "Synthesis and characterization of high-molecular weight aliphatic polyesters from monomers derived from renewable resources", Journal of Applied Polymer Science, vol. 131, Issue 15 (Year: 2014).*

Search Report under Section 17(5) for GB Application No. GB 1905587.0 dated Oct. 14, 2019.

International Search Report and Written Opinion for International Application No. PCT/GB2020/050984 mailed Jul. 9, 2020.

International Preliminary Report on Patentability (Chapter II) for International Application No. PCT/GB2020/050984 mailed Mar. 24, 2021.

Rwei et al., Synthesis and characterization of adipic acid/ polyethylene glycol/poly(ethylene terephthalate) copolyester fiber. Text Res J. Feb. 2015;85(16);1691-703.

\* cited by examiner

Scheme 1. Synthesis of coPETAzA copolymer series.

COPOLYESTERS AND PROCESSES FOR PREPARING COPOLYESTERS SUITABLE FOR USE IN FOOD CONTACT APPLICATIONS

CROSS-REFERENCE TO RELATED APPLICATIONS

This application is a national stage filing under 35 U.S.C. § 371 of International Application No. PCT/GB2020/050984, filed Apr. 20, 2020, which claims the benefit of United Kingdom Application No. GB 1905587.0, filed Apr. 18, 2019, each of which is hereby incorporated herein by reference in its entirety.

The present invention relates to copolyesters and processes to prepare them. In particular, the invention relates to processes for preparing copolyesters derived from aromatic acids such as terephthalic acid (TPA), isophthalic acid (IPA) and/or naphthalene-dicarboxylic acid (NDA), aliphatic acids such as azelaic acid (AzA) and glycols such as ethylene glycol (EG), and further relates to the copolyester itself.

As used herein, the term "copolyester" refers to a polymer which comprises ester linkages and which is derived from three or more types of comonomers. As used herein, the term "corresponding base polyester" refers to a polymer which comprises ester linkages and which is derived from two types of comonomers comprising ester-forming functionalities (e.g. PET or PEN), and which serves as a comparator for a copolyester which is derived from comonomers comprising the comonomers of the corresponding base polyester. A comonomer comprising ester-forming functionalities preferably possesses two ester-forming functionalities.

Copolyesters derived from three or more types of comonomers (i.e. multiple different acids and/or alcohols) exhibit different properties from base polyesters derived from two comonomers (i.e. one acid and one alcohol). Such base polyesters include polyethylene terephthalate (PET) and polyethylene naphthalene (PEN), which are prepared solely from ethylene glycol (EG) and, as acid, terephthalic acid (TPA) or naphthalene-dicarboxylic acid (NDA) respectively. Copolyesters derived from three or more types of comonomers may have improved properties compared to the corresponding base polyesters. Copolyesters can be derived from two or more acid components and one or more alcohol components. Changing the mix of acids used to prepare a copolyester can be used to advantageously improve the copolyester properties compared to base polyesters such as PET or PEN.

However, preparing such copolyesters on a large, industrial scale has not proved straightforward. The process for preparing such copolyesters may be lengthy and slow compared to the process for preparing the base polyesters. For example, many side reactions may occur which can result in a large fraction of solvent extractable impurities being present in the copolyester. Such oligomeric impurities may render the copolyester unsuitable for contact with food or other human ingestible substances. Food contact materials should have food contact approval, the requirements for which are set by various national and regional standards and legalisation (e.g. by the US FDA or in the EU). Therefore, if food contact approval is required, it is especially desired that the copolyester is substantially free of such oligomeric impurities. Reducing the amount of oligomeric impurities in the copolyester is also desirable for many other (non-food contact) applications where more precise control of the polymer properties may be desirable, for example, where exacting optical and/or thermo-mechanical properties are required in the end applications in which the copolyester, film and/or articles made therefrom are to be used.

Without wishing to be bound by any theory, it is believed that the extractable impurities commonly present in some known copolyesters comprise cyclic oligomers (having a molecular weight of 2000 dalton and below, preferably 1000 dalton and below, more preferably 500 dalton and below) derived from the numerous side reactions that can occur (e.g. during polycondensation and ester interchange reactions) when a glycol is reacted in the presence of a plurality of different diacids (such as an aromatic acid and an aliphatic acid).

The term "extractables" denotes material that can be extracted from a copolymer mixture using a suitable organic solvent. The solvent used will depend on the nature of the extractable material, but typical solvents used are THF, chloroform, xylene and/or ethanol, with ethanol being preferred in this case.

It would be desirable to solve some or all of the problems mentioned herein to provide improved copolyesters and improved processes for making them. It is a particular object of the present invention to provide a copolyester, and a process for making said copolyester, wherein the amount of impurities and extractables in the copolyester derived from such side reactions is reduced.

According to a first aspect, the present invention provides a process for preparing a copolyester comprising repeating units derived from (i) at least one aliphatic glycol, (ii) at least one aromatic dicarboxylic acid, and (iii) at least one aliphatic dicarboxylic acid, wherein the aliphatic dicarboxylic acid constitutes a proportion of the acid fraction of the copolyester; and wherein the process comprises the steps of:
(a) reacting in an esterification reaction said at least one aliphatic glycol (i) with a dicarboxylic acid selected from said at least one aromatic dicarboxylic acid (ii) or said at least one aliphatic dicarboxylic acid (iii) to form an ester of the respective acid(s);
(b) optionally reacting in an ester interchange reaction the ester obtained and/or obtainable from step (a) with a further dicarboxylic acid from which the ester used in step (b) is not derived, said further dicarboxylic acid being selected from said aromatic dicarboxylic acid (ii) or said aliphatic dicarboxylic acid (iii); or
(c) optionally reacting in an ester interchange reaction (e.g. a transesterification), the ester obtained and/or obtainable from step (a) with a further ester which is different from the ester obtained and/or obtainable from step (a), said further ester being selected from the ester of said aromatic dicarboxylic acid (ii) or the ester of said aliphatic dicarboxylic acid (iii);
wherein one of steps (b) and (c) are present.

According to a second aspect, the present invention provides a copolyester comprising repeating units derived from:
(i) at least one aliphatic glycol,
(ii) at least one aromatic dicarboxylic acid, and
(iii) at least one aliphatic dicarboxylic acid,
wherein the aliphatic dicarboxylic acid (iii) constitutes a proportion of the acid fraction of the copolyester.

The copolyester may be obtained from the process of the invention.

Thus, the present invention provides a copolyester comprising repeating units derived from
(i) at least one aliphatic glycol, preferably a $C_{2-4}$ alkylene diol, more preferably ethylene glycol (EG);

(ii) at least one aromatic dicarboxylic acid, preferably selected from the group consisting of terephthalic acid (TPA), isophthalic acid (IPA), naphthalene-dicarboxylic acid (NDA) and mixtures thereof, and (iii) at least one aliphatic dicarboxylic acid, preferably a saturated aliphatic dicarboxylic acid, preferably an aliphatic dicarboxylic acid represented by Formula (I):

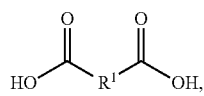

wherein $R^1$ denotes a divalent $C_{2-18}$ hydrocarbon radical, preferably a $C_{2-18}$ hydrocarbylene; more preferably a saturated $C_{4-10}$ alkylene, more preferably a linear $C_{4-8}$ alkylene, even more preferably a linear $C_{6-8}$ alkylene, and particularly 1,4-butylene, 1,6-hexylene, 1,7-heptylene or 1,8-octylene, especially 1,7-heptylene; and wherein the aliphatic dicarboxylic acid (iii) constitutes a proportion of the acid fraction of the copolyester.

Preferably, the copolyester is substantially free of impurities formed by the side reactions between any of the glycol component(s) (i), the aromatic dicarboxylic acid component(s) (ii) and/or the aliphatic dicarboxylic acid component(s) (iii). Preferably, the copolyester is substantially free of impurities formed by the side reactions between any of the glycol component(s) (i) with the aromatic dicarboxylic acid component(s) (ii) and/or the aliphatic dicarboxylic acid components (iii).

As used herein the term "side reaction" denotes a reaction during formation of the copolyesters which leads to termination of polymerisation and/or polycondensation and/or end of addition to (i.e. growth in) the polymer chain of the copolyesters and/or reactions which compete to form different polymers. For example, some side reactions produce oligomers such as cyclic oligomers, some of which are identified herein.

Preferably, the copolyesters are substantially free of oligomeric impurities from side reactions that have a number average molecular weight ($M_n$) of 500 daltons or less. Preferably, the copolyesters are substantially free of cyclic oligomer impurities from side reactions that have a number average molecular weight ($M_n$) of 1000 daltons or less. Preferably, the copolyesters are substantially free of cyclic oligomer impurities from side reactions that have a number average molecular weight ($M_n$) of 2000 daltons or less. The term "substantially free" is defined below.

Preferably, the copolyesters are substantially free of the cyclic moiety (that may be formed as an impurity from side reactions) represented by the following formula:

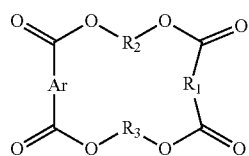

wherein Ar is the aromatic ring derived from the aromatic dicarboxylic acid, preferably phenyl or naphthyl, preferably phenyl, and $R^1$, $R^2$ and $R^3$ are as represented herein, namely:

$R^1$ denotes a divalent $C_{2-18}$ hydrocarbon radical, preferably $C_{2-18}$ hydrocarbylene; more preferably saturated $C_{4-10}$ alkylene, even more preferably linear $C_{6-8}$ alkylene and most preferably 1,6-hexylene, 1,7-heptylene, and/or 1,8-octylene, for example 1,7-heptylene; and $R^2$ and $R^3$ are independently, preferably the same, divalent $C_{2-4}$ alkylene radicals, and more preferably are both ethylene.

For example, when the copolyester comprises repeating units derived from the aliphatic glycol (i), terephthalic acid and the aliphatic dicarboxylic acid (iii), the copolyester is substantially free of the cyclic moiety represented by the following formula:

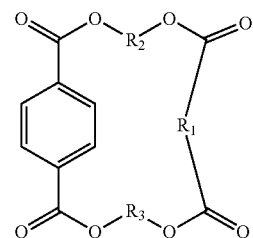

wherein $R^1$, $R^2$ and $R^3$ are as represented herein, namely:

$R^1$ denotes a divalent $C_{2-18}$ hydrocarbon radical, preferably $C_{2-18}$ hydrocarbylene; more preferably saturated $C_{4-10}$ alkylene, even more preferably linear $C_{6-8}$ alkylene and most preferably 1,6-hexylene, 1,7-heptylene, and/or 1,8-octylene, for example 1,7-heptylene; and $R^2$ and $R^3$ are independently, preferably the same, divalent $C_{2-4}$ alkylene radicals, and more preferably are both ethylene.

For example, when the copolyester comprises repeating units derived from terephthalic acid, azelaic acid and ethylene glycol, the copolyester is substantially free of the cyclic moiety represented by the following formula:

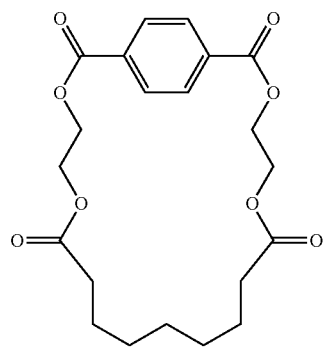

For example, when the copolyester comprises repeating units derived from the aliphatic glycol (i), naphthalenedicarboxylic acid and the aliphatic dicarboxylic acid (iii), the copolyester is substantially free of the cyclic moiety represented by the following formula:

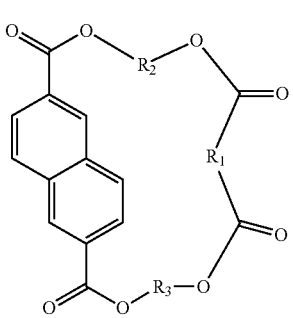

wherein $R^1$, $R^2$ and $R^3$ are as represented herein, namely:
$R^1$ denotes a divalent $C_{2-18}$ hydrocarbon radical, preferably $C_{2-18}$ hydrocarbylene; more preferably saturated $C_{4-10}$ alkylene, even more preferably linear $C_{6-8}$ alkylene and most preferably 1,6-hexylene, 1,7-heptylene, and/or 1,8-octylene, for example 1,7-heptylene; and
$R^2$ and $R^3$ are independently, preferably the same, divalent $C_{2-4}$ alkylene radicals, and more preferably are both ethylene.

For example, when the copolyester comprises repeating units derived from naphthalene-dicarboxylic acid, azelaic acid and ethylene glycol, the copolyester is substantially free of the cyclic moiety represented by the following formula:

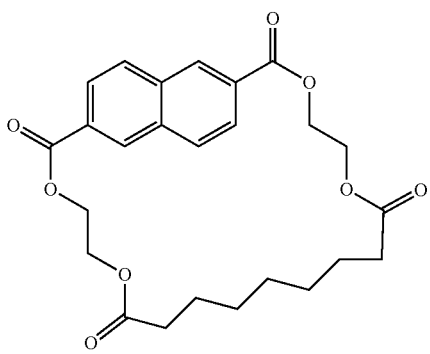

Preferably, the copolyesters are substantially free of at least one cyclic moiety, most preferably substantially free of both cyclic moieties, represented by the following formulae (that may be formed as impurities from side reactions):

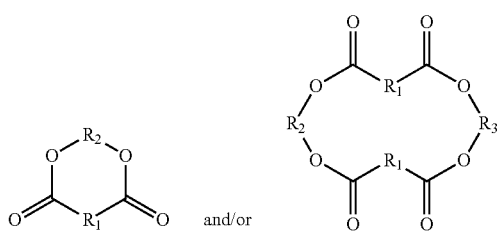

wherein $R^1$, $R^2$ and $R^3$ are as represented herein, namely:
$R^1$ denotes a divalent $C_{2-18}$ hydrocarbon radical, preferably $C_{2-18}$ hydrocarbylene; more preferably saturated $C_{4-10}$ alkylene, even more preferably linear $C_{6-8}$ alkylene and most preferably 1,6-hexylene, 1,7-heptylene, and/or 1,8-octylene, for example 1,7-heptylene; and $R^2$ and $R^3$ are independently, preferably the same, divalent $C_{2-4}$ alkylene radicals, and more preferably are both ethylene.

For example, when the copolyester comprises repeating units derived from the aromatic dicarboxylic acid (ii), ethylene glycol and azelaic acid, the copolyester is preferably substantially free of at least one cyclic moiety, most preferably substantially free of both cyclic moieties, represented by the following formulae (that may be formed as impurities from side reactions):

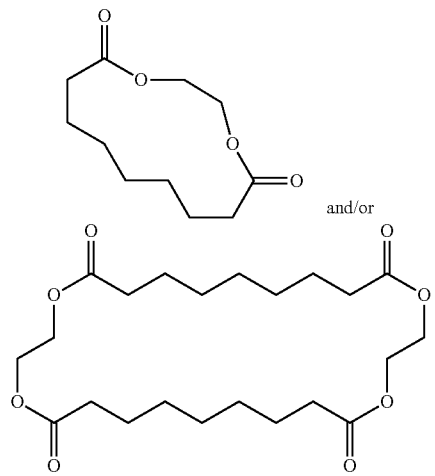

The copolyesters described herein are preferably thermoplastic.

The copolyesters described herein can be readily obtained at high molecular weight. The number average molecular weight ($M_n$) of the copolyester is preferably at least about 8000 g/mol, preferably at least about 9000 g/mol, preferably at least about 10000 g/mol, preferably at least about 11000 g/mol. The number average molecular weight ($M_n$) of the copolyester is preferably no more than about 25000 g/mol, preferably no more than about 23000 g/mol, preferably no more than about 21000 g/mol, preferably no more than about 20000 g/mol. The number average molecular weight ($M_n$) of the copolyester is preferably from about 8000 to about 25000 g/mol, preferably from about 9000 to about 23000 g/mol, preferably from about 10000 to about 21000 g/mol, preferably from about 11000 to about 20000 g/mol.

The copolyesters described herein can be melt-processed below 320° C. (preferably below 300° C.) into tough, high strength articles.

In a preferred embodiment, the aliphatic dicarboxylic acid is present in amounts of no more than about 60 mol % of the acid fraction of the copolyester, preferably no more than about 55 mol %, preferably no more than about 50 mol %, preferably no more than about 40 mol %, preferably no more than about 35 mol %, preferably no more than about 30 mol %, preferably no more than about 20 mol %, preferably no more than about 15 mol % and preferably no more than about 10 mol %. Preferably, the aliphatic dicarboxylic acid is present in an amount of at least about 1 mol %, more preferably at least about 3 mol %, more preferably at least about 4 mol %, more preferably at least about 5 mol % of the acid fraction of the copolyester.

In a preferred embodiment, the aliphatic dicarboxylic acid is present in amounts of from about 1 to about 60 mol % of the acid fraction of the copolyester, preferably from about 3 to about 55 mol %, preferably from about 5 to about 50 mol %.

In a further preferred embodiment, the aliphatic dicarboxylic acid is present in amounts of from about 5 to about 30 mol % of the acid fraction of the copolyester, preferably from about 5 to about 20 mol %, preferably from about 5 to about 15 mol %, preferably from about 5 to about 10 mol %, preferably from about 6 to about 8 mol %, for example about 7 mol %.

In another preferred embodiment, the aliphatic dicarboxylic acid is present in amounts of from about 30 to about 50 mol % of the acid fraction of the copolyester, preferably from about 35 to about 48 mol %, preferably from about 40 to about 45 mol %, preferably from about 41 to about 44 mol %.

In a preferred embodiment, the aliphatic dicarboxylic acid of Formula (I) is present in amounts of no more than about 60 mol % of the acid fraction of the copolyester, preferably no more than about 50 mol %, preferably no more than about 40 mol %, preferably no more than about 30 mol %, preferably no more than about 20 mol %, in one embodiment no more than about 15 mol % and in a further embodiment no more than about 10 mol %. Preferably the aliphatic dicarboxylic acid of Formula (I) is present in an amount of at least about 1 mol %, more preferably at least about 3 mol % (i.e. 3 mol % or greater than 3 mol %), more preferably at least about 4 mol % (i.e. 4 mol % or greater than 4 mol %), more preferably at least about 5 mol % (i.e. 5 mol % or greater than 5 mol %) of the acid fraction of the copolyester. In a preferred embodiment, the aliphatic dicarboxylic acid of Formula (I) may be present in amounts of from about 1 to about 60 mol %, preferably from about 1 to about 50 mol % of the acid fraction of the copolyester, more preferably from about 3 about 40 mol %, even more preferably about 4 about 30 mol %, preferably from about 5 to about 20 mol %, in a further preferred embodiment from about 5 to about 15 mol % and in a further preferred embodiment from about 5 to about 10 mol %. In another preferred embodiment a preferred range for the aliphatic dicarboxylic acid is from 30 to 50 mol %, more preferably 30 to 40 mol %, most preferably 30 to 35 mol % of the acid fraction of the copolyester.

The aromatic dicarboxylic acid component (ii) of the copolyesters is preferably selected from terephthalic acid, isophthalic acid, naphthalene-dicarboxylic acid, isomers thereof and mixtures thereof. Other aromatic dicarboxylic acids which may be used in the present invention include phthalic acid and 4,4'-diphenyldicarboxylic acid. Optionally, the naphthalene-dicarboxylic acid is 1,4-naphthalene-dicarboxylic acid. Preferred naphthalene-dicarboxylic acid can be selected from 2,5-, 2,6- or 2,7-naphthalene dicarboxylic acid, and is more preferably 2,6-naphthalene dicarboxylic acid. Preferably, the aromatic dicarboxylic acid (ii) is selected from terephthalic acid and naphthalene-dicarboxylic acid, preferably from terephthalic acid and 2,5-, 2,6- or 2,7-naphthalenedicarboxylic acid, preferably from terephthalic acid or 2,6-napthaleinedicarboxylic acid, and preferably terephthalic acid.

The aliphatic glycol component (i) of the copolyesters is preferably selected from $C_2$, $C_3$ and $C_4$ aliphatic diols, more preferably from ethylene glycol, 1,3-propanediol and 1,4-butanediol, more preferably from ethylene glycol and 1,4-butanediol, and is most preferably ethylene glycol.

The copolyester may contain more than one type of the aliphatic glycols (i) described herein. Preferably, however, the copolyester comprises a single type of the aforementioned aliphatic glycols (i). Where the copolyester contains more than one type of said aliphatic glycols, then preferably the copolyester comprises a major aliphatic glycol fraction of a single type of said aliphatic glycols, and a minor aliphatic glycol fraction of one or more different type(s) of said aliphatic glycols, wherein said one or more different type(s) of said aliphatic glycols constitutes no more than 10 mol %, preferably no more than 5 mol %, preferably no more than 1 mol % of the total glycol fraction.

The copolyesters may contain minor amounts of other glycols, such as cycloaliphatic glycols. A suitable cycloaliphatic glycol may contain a single ring, preferably a 6-membered ring, and is preferably 1,4-cyclohexanedimethanol (CHDM). In a preferred embodiment, such other glycols constitute no more than 10 mol %, preferably no more than 5 mol %, and preferably no more than 1 mol % of the total glycol fraction. However, in order to maximise performance it is preferred that the glycol fraction consists of the aliphatic glycol(s) (i) described above.

The aliphatic dicarboxylic acid component (iii) of the copolyesters is preferably selected from long chain aliphatic dicarboxylic acids, and such aliphatic dicarboxylic acids are preferably saturated and/or linear diacids. Preferably, aliphatic dicarboxylic acids of component (iii) are selected from $C_{4-20}$ aliphatic dicarboxylic acids, more preferably $C_{6-15}$ aliphatic dicarboxylic acids, more preferably $C_{6-13}$ aliphatic dicarboxylic acids, even more preferably $C_{6-12}$ aliphatic dicarboxylic acids, most preferably $C_{6-10}$ aliphatic dicarboxylic acids.

Preferably, the aliphatic dicarboxylic acid is a saturated aliphatic dicarboxylic acid, preferably an aliphatic dicarboxylic acid represented by Formula (I):

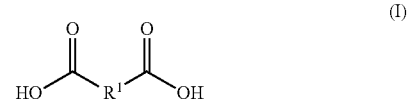

wherein $R^1$ denotes a divalent $C_{2-18}$ hydrocarbon radical, preferably a $C_{2-18}$ hydrocarbylene; more preferably a saturated $C_{4-10}$ alkylene, more preferably a linear $C_{4-8}$ alkylene, even more preferably a linear $C_{6-8}$ alkylene, and particularly 1,4-butylene, 1,6-hexylene, 1,7-heptylene or 1,8-octylene, especially 1,7-heptylene.

Preferably, the aliphatic dicarboxylic acid component (iii) is a linear, saturated aliphatic dicarboxylic acid selected from the group consisting of:
succinic acid ($HOOC(CH_2)_2COOH$ or butan-1,4-dioic acid);
glutaric acid ($HOOC(CH_2)_3COOH$ or pentan-1,5-dioic acid);
adipic acid ($HOOC(CH_2)_4COOH$ or hexan-1,6-dioic acid);
pimelic acid ($HOOC(CH_2)_5COOH$ or heptan-1,7-dioic acid);
suberic acid ($HOOC(CH_2)_6COOH$ or octan-1,8-dioic acid);
azelaic acid ($HOOC(CH_2)_7COOH$ or nonan-1,9-dioic acid);
sebacic acid ($HOOC(CH_2)_8COOH$ or decan-1,10-dioic acid);
undecan-1,11-dioic acid ($HOOC(CH_2)_9COOH$);
dodecan-1,12-dioic acid ($HOOC(CH_2)_{10}COOH$);
tridecanedioic acid ($HOOC(CH_2)_{11}COOH$)
and/or any mixtures thereof.

Preferably, the aliphatic dicarboxylic acid component (iii) is represented by Formula (I) and is selected from adipic, suberic, azelaic and/or sebacic acids.

Preferably, the aliphatic dicarboxylic acid component (iii) is azelaic acid, abbreviated as AzA herein, and represented by Formula (IA):

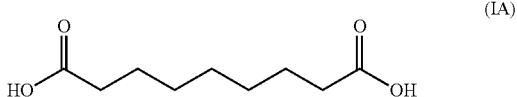 [SMILES: O=C(O)CCCCCCCC(=O)O]

The copolyester may contain more than one type of the aliphatic dicarboxylic acids (iii) described herein. Where the copolyester contains more than one type of said aliphatic dicarboxylic acid, preferably the copolyester comprises a major aliphatic dicarboxylic acid fraction of a single type of said aliphatic dicarboxylic acids, and a minor aliphatic dicarboxylic acid fraction of one or more different type(s) of said aliphatic dicarboxylic acids, wherein said one or more different type(s) of said aliphatic dicarboxylic acids constitutes no more than 15 mol %, preferably no more than 12 mol, preferably no more than 10 mol %, preferably no more than 5 mol %, preferably no more than 1 mol % of the total aliphatic dicarboxylic acid fraction.

For example, the copolyester may comprise a major aliphatic dicarboxylic acid fraction of azelaic acid, and a minor aliphatic dicarboxylic acid fraction of one or more other aliphatic dicarboxylic acids, for example a $C_{13}$ aliphatic dicarboxylic acid.

In the process of the present invention, preferably step (c) is present.

Preferably, in step (a), the aliphatic glycol is reacted with the dicarboxylic acid to form a bis(hydroxyalkyl)-ester of said dicarboxylic acid.

Preferably, in step (a), ethylene glycol is reacted with the dicarboxylic acid to form a bis(hydroxyethyl)-ester of said dicarboxylic acid. When the dicarboxylic acid is terephthalic acid, the ester formed is bis(hydroxyethyl)-terephthalate (BHET). When the dicarboxylic acid is naphthalene dicarboxylic acid, the ester formed is bis(hydroxyethyl)-naphthalate (BHEN), preferably bis(2-hydroxyethyl) 2,6 naphthalate. When the dicarboxylic acid is azelaic acid, the ester formed is bis(2-hydroxyethyl)azelate (BHEA). Thus, the ester obtained and/or obtainable from step (a) is preferably BHET, BHEN or BHEA.

The reactions in step (a), (b) and/or (c) may be under conditions of elevated pressure or atmospheric pressure. In one embodiment, the reactions in steps (a), (b) and (c) (when present) are under conditions of elevated pressure. However, preferably, at least one of the reactions in steps (a), (b) and/or (c) (when present) are under conditions of atmospheric pressure. This may be advantageous to increase manufacturing efficiency and reduce costs.

When step (a) comprises reacting the aliphatic glycol (i) with the aromatic dicarboxylic acid (ii), the reaction in step (a) is preferably under conditions of elevated pressure. However, when step (a) comprises reacting the aliphatic glycol (i) with the aliphatic dicarboxylic acid (iii), the reaction in step (a) may be under conditions of elevated pressure or atmospheric pressure, preferably atmospheric pressure.

Preferably the reaction in step (b) or step (c) is under atmospheric pressure.

Preferably, steps (a), (b) and/or (c) are performed at a temperature from about 140° C. to about 265° C., preferably about 160° C. to about 260° C., preferably from about 170° C. to about 250° C., more preferably from about 180° C. to about 240° C.

Preferably, the copolyester obtained by the process is substantially free of impurities formed by the side reactions between any of the glycol component(s) (i), the aromatic dicarboxylic acid component(s) (ii) and/or the aliphatic dicarboxylic acid component(s) (iii). Preferably, the copolyester obtained by the process is substantially free of impurities formed by the side reactions between any of the glycol component(s) (i) with the aromatic dicarboxylic acid component(s) (ii) and/or the aliphatic dicarboxylic acid components (iii).

Preferably, step (c) is or comprises reacting a bis(hydroxyalkyl)-ester of an aromatic dicarboxylic acid (preferably a bis(hydroxyethyl)-ester of TPA or NDA, for example BHET or BHEN) with a bis(hydroxyalkyl)-ester of a $C_{4-20}$ aliphatic dicarboxylic acid (preferably a bis(hydroxyethyl)-ester of a $C_{6-10}$ aliphatic dicarboxylic acid, preferably BHEA). Preferably, the bis(hydroxyalkyl)ester of a $C_{4-20}$ aliphatic dicarboxylic acid (preferably a bis(hydroxyethyl)-ester of a $C_{6-10}$ aliphatic dicarboxylic acid, preferably BHEA) is obtained and/or obtainable from step (a).

In a preferred process of the invention, the copolyesters obtained from the process are substantially free of any oligomeric impurities formed by a side reaction of any of the glycol component(s) (i) with the aliphatic dicarboxylic acid component(s) (iii).

The ester obtained or obtainable from step (a), or the further ester used in step (c), may be the ester of the aliphatic dicarboxylic acid (iii). Said ester may be represented by Formula (II):

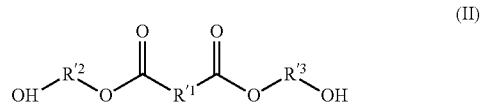

wherein $R^{i1}$ denotes a divalent $C_{2-18}$ hydrocarbon radical, preferably $C_{2-18}$ hydrocarbylene, more preferably saturated $C_{4-10}$ alkylene, even more preferably linear $C_{6-8}$ alkylene, and most preferably 1,4-butylene, 1,6-hexylene, 1,7-heptylene and/or 1,8-octylene, and for example 1,7 heptylene; and $R^{i2}$ and $R^{i3}$ are independently, preferably the same, divalent $C_{2-4}$alkylene radicals; more preferably are both ethylene;

wherein when $R^{i1}$ is 1,7-heptylene and $R^{i2}$ and $R^{i3}$ are both ethylene, Formula (II) represents bis(2-hydroxyethyl) azelate (BHEA).

The most preferred ester of Formula (II) is represented by Formula (IIA):

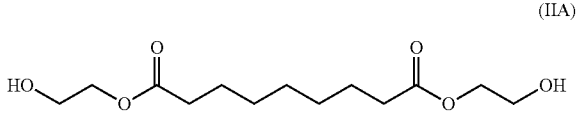 [SMILES: O=C(CCCCCCCC(=O)OCCO)OCCO]

Formula IIA is also known as bis(2-hydroxyethyl) azelate (BHEA) or 1,9-di(2-hydroxyethyl) nonandioate.

Preferably, steps (a), (b) and/or (c) (where present) are performed sequentially and/or simultaneously, preferably simultaneously, more preferably simultaneously in the same reaction vessel under the same reaction conditions.

Preferably, steps (a), (b) and/or (c) (where present) are performed in the same reaction vessel and/or under the same reaction conditions.

Steps (a), (b) and/or (c) (where present) may be performed without a catalyst being present. Alternatively, steps (a), (b) and/or (c) (where present) may be performed in the presence of a suitable esterification catalyst. The esterification catalyst (where present) is preferably a hydrated metal acetate, preferably a manganese catalyst.

Steps (a), (b) and/or (c) (where present) may be performed in the presence of a base, preferably NaOH.

Preferably, the residence time in the reaction vessel for either or each of the reagents in steps (a) and (b) and (c) (where present) is less than about 3 hours, preferably from about 1 to about 3 hours, preferably from about 1 to about 2 hours, preferably from about 1 to about 1.5 hours, for example about 1.25 hours.

In a preferred aspect of the present invention, the process comprises reacting the aliphatic glycol with the aromatic dicarboxylic acid to form a bis(hydroxyalkyl)-ester of said aromatic dicarboxylic acid (step (a)). The bis(hydroxyalkyl)-ester of said aromatic dicarboxylic acid is then reacted with the aliphatic dicarboxylic acid (step (b)) and/or with an ester of the aliphatic dicarboxylic acid (step (c)). Preferably, the ester of the aliphatic dicarboxylic acid is a bis(hydroxyalkyl)-ester. Preferably, step (c) is present.

Preferably, ethylene glycol (EG) is esterified by adding terephthalic acid (TPA) and/or naphthalene dicarboxylic acid (NDA) in step (a). Thus, a TPA:EG or NDA:EG adduct is obtained. Then, in step (b) azelaic acid (AzA) and/or in step (c) bis(2-hydroxyethyl) azelate (BHEA) is added to the TPA:EG or NDA:EG adduct from step (a).

In one example of the present invention, ethylene glycol (EG) is reacted with terephthalic acid (TPA) to form a TPA:EG adduct in step (a). The adduct is then reacted with azelaic acid (AzA) via an ester interchange reaction in step (b). The ester interchange reaction ran well.

In a further preferred aspect of the present invention, the process comprises reacting the aliphatic dicarboxylic acid with the aliphatic glycol to form a bis(hydroxyalkyl)-ester of said aliphatic dicarboxylic acid (step (a)). The bis(hydroxyalkyl)-ester of said aliphatic dicarboxylic acid is then reacted with the aromatic dicarboxylic acid (step (b)) and/or with an ester of the aromatic dicarboxylic acid (step (c)). Preferably, the ester of the aromatic dicarboxylic acid is a bis(hydroxyalkyl)-ester of the dicarboxylic aromatic acid. Preferably, step (c) is present.

Preferably, azelaic acid (AzA) is esterified by the addition of ethylene glycol (EG). Thus, an AzA:EG adduct is formed. Then, in ester interchange step (c), bis(2-hydroxyethyl) terephthalate (BHET) and/or bis(2-hydroxyethyl) naphthalate (BHEN) is added to the AzA:EG adduct from step (a) to undergo transesterification.

In one example of the present invention, ethylene glycol (EG) is reacted with azelaic acid (AzA) in step (a) to form an AzA:EG adduct. The adduct is reacted via a transesterification reaction in step (c) with BHET. The transesterification reaction ran moderately well.

The inventors have found that incorporation of groups derived from specific aliphatic dicarboxylic acids (iii) of Formula I into the polyester either directly via reacting the dicarboxylic acid in step (b) and/or indirectly by use of the ester of Formula II in step (c) leads to a copolyester having advantageous properties. In particular, the inventors have found that incorporation of groups derived from the aliphatic dicarboxylic acids (iii) via step (b) and/or step (c) leads to a copolyester having advantageous properties compared to a copolyester formed by direct polymerisation of the aliphatic glycol, the aliphatic dicarboxylic acid and the aromatic dicarboxylic acid (i.e. where the three monomers are reacted together in a first esterification step followed by a polycondensation step).

As will be appreciated by the skilled person, the process further comprises a polycondensation step (d) to form the copolyester. Thus, the process of the present invention preferably comprises step (a), optional step (b), optional step (c), and polycondensation step (d), wherein one of steps (b) and (c) are present.

The process of the invention can be performed using conventional techniques for the manufacture of polyester materials by condensation, typically at temperatures up to about 310° C. Preferably, the polycondensation is performed at a temperature of from about 255° C. to about 310° C., preferably from about 265° C. to about 310° C., preferably from about 275° C. to about 310° C., preferably from greater than 275° C. to about 310° C., more preferably from about 280° C. to about 300° C., most preferably from about 285° C. to about 290° C.

Preferably, the polycondensation is performed under reduced pressure, such as under a vacuum of no greater than about 1 torr, such as under a vacuum of between 0.1 and 1 torr.

During polycondensation step (d), the intrinsic viscosity (IV) of the copolymer being produced may be measured and the reaction stopped and/or the copolymer removed from the reaction vessel when a predefined intrinsic viscosity (IV) value has been reached.

Preferably, the polycondensation reaction time (e.g. the residence time in the reaction vessel) is no greater than about 5 hours, preferably no greater than about 4 hours, preferably no greater than about 3.5 hours, preferably no greater than about 3 hours. Preferably, the polycondensation reaction time is from about 1 to about 4 hours, preferably from about 1 to about 3.5 hours, preferably from about 1 to about 3 hours, preferably from about 1 to about 2 hours, most preferably is about 1 to about 1.5 hours, for example about 1.25 hours.

Preferably, the polycondensation step (d), is performed in the presence of a suitable catalyst, which may be selected from a germanium, antimony and/or titanium catalyst. If food contact approval is desired for the copolyesters, the catalyst preferably comprises a titanium catalyst, most preferably a TiPT catalyst (as described herein). A suitable catalyst is commercially available as Tyzor AC422 (Dorf Ketal).

Polycondensation denotes a step growth polymerisation where a polymer is formed by reactive polymer precursors of various degrees of polymerisation (i.e. monomers, oligomers and/or polymers) joining together (condensing) by sequential addition to an active site to form a polymer chain and losing small molecules such as water or methanol in the process.

Polycondensation may include a solid phase polymerisation (SSP) stage. The solid phase polymerisation may be carried out in a fluidised bed, e.g. fluidised with nitrogen, or in a vacuum fluidised bed, using a rotary vacuum drier. Suitable solid phase polymerisation techniques are disclosed in, for example, EP0419400 the disclosure of which is incorporated herein by reference. Thus, SSP is typically conducted at a temperature 10-50° C. below the crystalline melting point ($T_m$) of the polymer but higher than the glass transition temperature ($T_g$). An inert atmosphere of dry nitrogen or a vacuum is used to prevent degradation. In one embodiment, the copolyester is prepared using titanium-based catalysts which provide a polymeric material having a reduced level of contaminants such as catalyst residues, undesirable inorganic deposits and other by-products of polymer manufacture.

An ester interchange reaction (also referred to herein as transesterification) is the process of exchanging the organic group of an ester with the organic group of an alcohol and/or other ester and is often catalyzed by the addition of an acid or base catalyst or enzyme.

In one embodiment, the aliphatic glycol is reacted with the naphthalene dicarboxylic acid to form a bis(hydroxyalkyl)-naphthalate, which is then reacted with the aliphatic dicarboxylic acid of Formula (I) in the desired molar ratios, preferably under conditions of elevated temperature and pressure in the presence of a catalyst.

In a further embodiment, the aliphatic glycol is reacted with the terephthalic acid to form a bis(hydroxyalkyl)-terephthalate, which is then reacted with the aliphatic dicarboxylic acid of Formula (I) in the desired molar ratios, preferably under conditions of elevated temperature and pressure in the presence of a catalyst, as exemplified in Scheme (1) shown in FIG. 1 herein, which is non limiting and by way of example only.

The process according to the present invention described hereinabove advantageously allows preparation of the copolyester with high selectivity and high yield. The process advantageously also provides a stable and relatively rapid reaction, facilitating a reliable and reproducible polymerisation and allowing scale-up in a safe and economical manner, and also improves the uniformity of the copolyester.

The polydispersity index, PDI, (or dispersity, D) is defined as the weight average molecular weight ($M_w$)/number average molecular weight ($M_n$). The polydispersity index is a measure of the uniformity (or heterogeneity) of the size of the different macromolecules that comprise a polymer (which is a mixture of macromolecules of different sizes). Compositions with a polydispersity index of 1 (i.e. which are monodisperse) consist of macromolecules each of which has the same size.

The copolyester preferably has a polydispersity index of above 1, preferably at least about 1.1, preferably at least about 1.2, preferably at least about 1.5, preferably at least about 2.0 and preferably no more than about 10.0, preferably no more than about 8.0, preferably no more than about 6.0, preferably no more than about 5.5, preferably no more than about 5.0, preferably no more than about 4.0. Thus, the copolyester preferably has a polydispersity index from about 1 to 10.0, preferably from about 1.1 to about 8.0, preferably from about 1.1 to about 6.0, preferably from about 1.2 to about 5.5, preferably from about 1.5 to about 5.0, preferably from about 2.0 to about 4.0.

Copolyesters wherein the aromatic dicarboxylic acid component (ii) comprises terephthalic acid can be described by Formula (III):

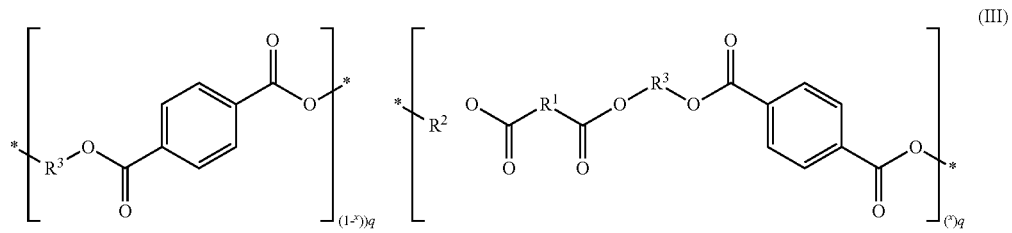

wherein
the group $R^1$ is as described herein and denotes the carbon chain of the aliphatic dicarboxylic acid;
the groups $R^2$ and $R^3$ are as described herein and denote independently the carbon chain of the aliphatic glycol(s) used to prepare the esters; and
x is the fraction of co-monomer (iii) the aliphatic acid containing repeating ester units in the copolyester, such that (x)q and (1−x)q denote respectively the molar fractions of the aliphatic acid-containing repeating ester units and the terephthalate ester-containing repeating ester unit as defined herein which together total q moles of copolyester.

Preferred copolyesters of Formula (III) are derived from ethylene glycol (EG), terephthalic acid (TPA) and azelaic acid (AzA) and can be described by Formula (IIIA):

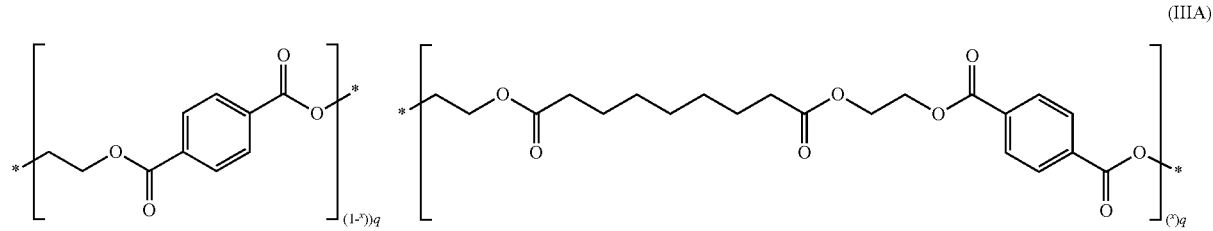

where x and q are as described above.

Copolyesters wherein the aromatic dicarboxylic acid component (ii) comprises 2,6-naphthalene dicarboxylic acid can be described by Formula (IV):

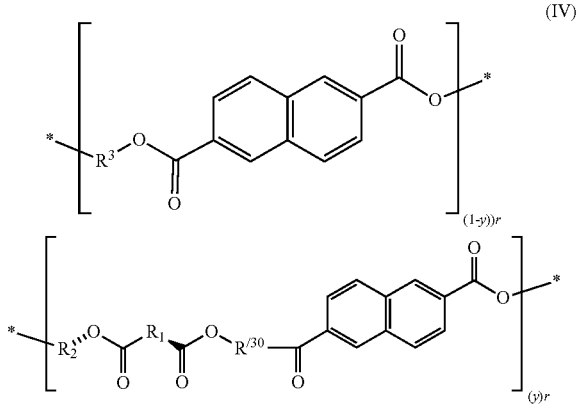

(IV)

wherein
the group $R^1$ is as described herein and denotes the carbon chain of the aliphatic dicarboxylic acid;
the groups $R^2$ and $R^3$ are as described herein and denote independently the carbon chain of the aliphatic glycol(s) used to prepare the esters; and
y is the fraction of co-monomer (iii) the aliphatic acid containing repeating ester units in the copolyester, such that (y)r and (1−y)r denote respectively the molar fractions of the aliphatic acid-containing repeating ester units and the 2,6-naphthalene dicarboxylate ester-containing repeating ester unit as defined herein which together total r moles of copolyester.

Preferred copolyesters of Formula (IV) are derived from ethylene glycol (EG), 2,6-naphthalene dicarboxylic acid and azelaic acid (AzA) and can be described by Formula (IVA):

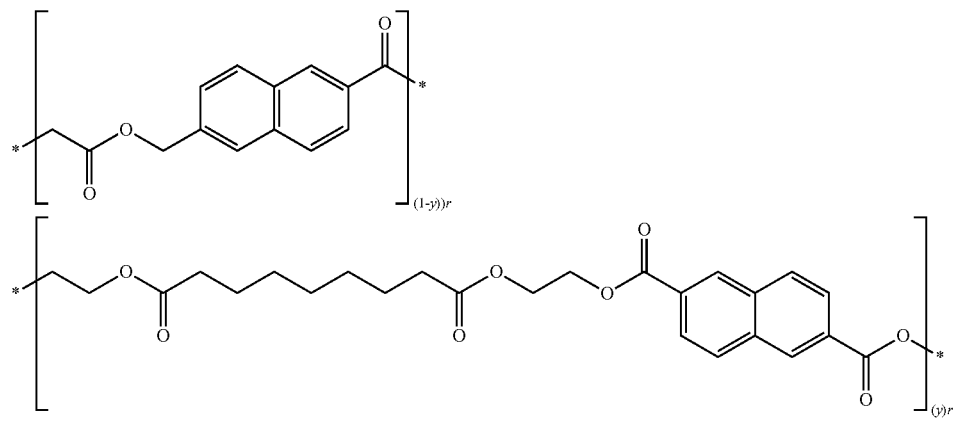

(IVA)

wherein y and r are as described above.

The copolyesters described herein contain moieties derived from more than one type of carboxylic acid. The copolyester comprise component (ii) moieties derived from an aromatic dicarboxylic acid, which is preferably terephthalic acid or naphthalene-dicarboxylic acid, as described herein. The copolyester also comprises component (iii) moieties derived from one or more aliphatic dicarboxylic acid(s), preferably aliphatic dicarboxylic acid(s) of Formula (I). Preferably, the acid fraction consists of a single aromatic dicarboxylic acid as described herein (e.g. TPA or NDA) and a single aliphatic dicarboxylic acid as described herein (e.g. AzA).

Thus, the copolyester as described herein preferably contains moieties derived from only (i) an aliphatic glycol (preferably ethylene glycol (EG)), (ii) an aromatic dicarboxylic acid (preferably terephthalic acid or naphthalene-dicarboxylic acid, more preferably terephthalic acid (TPA)) and (iii) an aliphatic dicarboxylic acid of Formula (I) defined herein (preferably azelaic acid (AzA)).

Previously, azelaic-PET copolymers were prepared by reacting terephthalic acid (TPA), azelaic acid (AzA) and ethylene glycol (EG) together in a first esterification step followed by a polycondensation step, sequentially in the same vessel or optionally in different vessels using an antimony (Sb) catalyst, where the esterification step was typically performed from 10 to 12 hours and the subsequent polycondensation step was performed for from 6 to 8 hours. The applicant has surprisingly found that, in the process of the invention, the reaction time of the esterification steps ((a), (b) and/or (c)) and/or polycondensation steps (step (d)) can be reduced by process modifications.

The applicant has surprisingly found it advantageous to use an ester interchange step (step (c)) where the aromatic diester (e.g. BHET or BHEN) is reacted with the aliphatic diester (e.g. BHEA) and then use a polycondensation step (d), wherein the polycondensation reaction is performed at a temperature of 265° C. or above, preferably at a temperature of greater than 275° C. This temperature is higher than used conventionally. The ester interchange step (step (c)) and/or the polycondensation step (d) optionally uses a titanium catalyst (preferably TiPT). The applicant has found that the proportion of low molecular weight (<2000 dalton, preferably <1000 dalton, more preferably <500 dalton) oligomers (capable of being extracted in organic solvent) formed during the process is significantly reduced, because the opportunity for side reactions is reduced, partially due to the shorter residence time of the reagents in the vessel.

Preferably, the process comprises reacting the aliphatic dicarboxylic acid with the aliphatic glycol in an esterification reaction to form a bis(hydroxyalkyl)-ester of said aliphatic dicarboxylic acid (step (a)). The bis(hydroxyalkyl)-ester components of the polyester may then be reacted with a bis(hydroxyalkyl)-ester of the aromatic dicarboxylic acid (step (c)). Then, polycondensation is initiated to form a polyester (step (d)).

Preferably, azelaic acid (AzA) is reacted with ethylene glycol (EG) in an esterification reaction to give an intermediate bis(2-hydroxyethyl) azelate (BHEA) ester (step (a)). In a further step, the BHEA ester components of the polyester may be reacted in an ester interchange reaction (transesterification) with another ester bis(2-hydroxyethyl) terephthalate (BHET) to give an azelaic-PET copolymer (step (c)). Then, polycondensation (PC) is initiated by adding a polycondensation (PC) catalyst (TiPT) to form a polyester (step (d)).

It is preferred that the copolyesters described herein are made using a titanium(iv) isopropoxide PC catalyst (also referred to as tetra isopropyl titanate or TiPT) as this is compatible with food contact regulations. In particular, it is preferred that polycondensation step (d) occurs using TiPT. Use of other PC catalysts such as Sb, if present as impurities in the final polymer, film or article made therefrom may not be able to be used in applications where food contact is required.

The copolyesters described herein are preferably used to prepare polymeric films (e.g. as a copolyester film web) which may be cast or orientated in either or both of the machine or transverse directions.

It will be appreciated that the preferences and elements described above apply equally to the first and second aspects of the invention.

According to a third aspect of the present invention, there is provided a film comprising a copolyester comprising repeating units derived from an aliphatic glycol, an aromatic dicarboxylic acid, and an aliphatic dicarboxylic acid, as defined hereinabove. The film is preferably an oriented film, preferably a biaxially oriented film.

Formation of the film is effected by conventional techniques well-known in the art. In general terms the process comprises the steps of extruding one or more layers of molten polymeric material, quenching the extrudate and orienting the quenched extrudate in at least one direction.

The film may be uniaxially oriented, but is preferably biaxially oriented by drawing in two mutually perpendicular directions in the plane of the film to achieve a satisfactory combination of mechanical and physical properties. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process, the film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is generally effected so that the dimension of the oriented film is from 2 to 5, more preferably 2.5 to 4.5 times its original dimension in the or each direction of stretching. Typically, stretching is effected at temperatures higher than the Tg of the polyester, preferably about 15° C. higher than the Tg. Greater draw ratios (for example, up to about 8 times) may be used if orientation in only one direction is required. It is not necessary to stretch equally in the machine and transverse directions although this is preferred if balanced properties are desired.

The stretched film may be, and preferably is, dimensionally stabilised by heat-setting under dimensional support at a temperature above the glass transition temperature of the polyester but below the melting temperature thereof, to induce the desired crystallisation of the polyester. During the heat-setting, a small amount of dimensional relaxation may be performed in the transverse direction (TD) by a procedure known as "toe-in". Toe-in can involve dimensional shrinkage of the order 2 to 4% but an analogous dimensional relaxation in the process or machine direction (MD) is difficult to achieve since low line tensions are required and film control and winding becomes problematic. The actual heat-set temperature and time will vary depending on the composition of the film (for example, depending on the composition of the copolyester in the film, for example, depending on the amount of aliphatic dicarboxylic acid in the acid fraction of the copolyester in the film) and its desired final thermal shrinkage but should not be selected so as to substantially degrade the toughness properties of the film such as tear resistance. Within these constraints, a heat set temperature of about 40 to about 240° C. is generally desirable. For example, when the film comprises a copolyester derived from at least one aliphatic dicarboxylic acid (iii) and said aliphatic dicarboxylic acid is present in amounts of from about 5 to 30 mol % of the acid fraction of the copolyester, preferably from about 5 to about 10 mol %, a heat set temperature of about 180 to 245° C., preferably 200 to 230° C., is preferred. However, when said aliphatic dicarboxylic acid is present in amounts of from about 30 to about 50 mol % of the acid fraction, preferably from about 40 to about 45 mol %, a heat set temperature of about 40 to about 100° C. is instead preferred. After heat-setting, the film is typically quenched rapidly in order induce the desired crystallinity of the polyester.

The film may be further stabilized through use of an in-line relaxation stage. Alternatively the relaxation treatment can be performed off-line. In this additional step, the film is heated at a temperature lower than that of the heat-setting stage, and with a much reduced MD and TD tension. The tension experienced by the film is a low tension and typically less than 5 kg/m, preferably less than 3.5 kg/m, more preferably in the range of from 1 to about 2.5 kg/m, and typically in the range of 1.5 to 2 kg/m of film width. For a relaxation process which controls the film speed, the reduction in film speed (and therefore the strain relaxation) is typically in the range 0 to 2.5%, preferably 0.5 to 2.0%. There is no increase in the transverse dimension of the film during the heat-stabilisation step. The temperature to be used for the heat stabilisation step can vary depending on the desired combination of properties from the final film, with a higher temperature giving better, i.e. lower, residual shrinkage properties. A temperature of 40 to 250° C. is generally desirable. For example, when the film comprises a copolyester derived from at least one aliphatic dicarboxylic acid (iii) and said aliphatic dicarboxylic acid is present in amounts of from about 5 to 30 mol % of the acid fraction of the copolyester, preferably from about 5 to about 10 mol %, a temperature of about 135 to 250° C. is preferred, for example about 150 to 230° C. When said aliphatic dicarboxylic acid is present in amounts of from about 30 to about 50 mol % of the acid fraction, preferably from about 40 to about 45 mol %, a temperature of about 40 to about 100° C. is instead preferred desirable.

The duration of heating will depend on the temperature used but is typically in the range of 10 to 40 seconds, with a duration of 20 to 30 seconds being preferred. This heat stabilisation process can be carried out by a variety of methods, including flat and vertical configurations and either "off-line" as a separate process step or "in-line" as a continuation of the film manufacturing process. Film thus processed will exhibit a smaller thermal shrinkage than that produced in the absence of such post heat-setting relaxation.

The copolyesters may also be applied as a coating solution and/or coextruded layer with another polymer film.

The copolyester is preferably the major component of the film or layer thereof, and makes up at least 65%, preferably at least 75%, preferably at least 85%, and preferably at least 95%, preferably at least 98% by weight of the total weight of the film or layer thereof. Said copolyester is preferably the only polyester present in the film or layer thereof.

The film may further comprise any other additive conventionally employed in the manufacture of polyester films. Thus, agents such as anti-oxidants, UV-absorbers, hydrolysis stabilisers, cross-linking agents, dyes, fillers, pigments, voiding agents, lubricants, radical scavengers, thermal stabilisers, flame retardants and inhibitors, anti-blocking agents, surface active agents, slip aids, gloss improvers, prodegrants, viscosity modifiers and dispersion stabilisers may be incorporated as appropriate. Such additives may be introduced into the copolyester composition in a conventional manner For example, the additive(s) may be introduced by mixing with the monomeric reactants from which the film-forming copolyester composition is derived, or the additive(s) may be mixed with the copolyester composition by tumble or dry blending or by compounding in an extruder, followed by cooling and, usually, comminution into granules or chips. Masterbatching technology may also be employed.

Preferably, the copolyester in the film, and optionally the film itself, are substantially free of wax. Preferably the copolyester in the film, and optionally the film itself, are free of wax.

The thickness of the film can be in the range of from about 1 to about 500 μm, typically no more than about 250 μm.

The preferences and elements described in respect of the first and second aspect of the invention apply equally to the third aspect of the invention.

In a fourth aspect, the present invention provides the use of the copolyester and/or the film described herein in an application for which food contact is required.

In a fifth aspect, the present invention provides a package comprising a copolyester and/or the film described herein. Preferably, the package contains a foodstuff or human ingestible item.

The preferences and elements described in respect of the first, second and third aspects of the invention apply equally to the fourth and fifth aspects of the invention.

ABBREVIATIONS

AzA denotes azelaic acid or nonane dioic acid (also represented by Formula IA herein).

BHEA denotes bis(2-hydroxyethyl) azelate [or 1,9-di(2-hydroxyethyl) nonanedioate], (also represented by Formula IIA herein).

BHET denotes bis(2-hydroxyethyl) terephthalate, which may be represented as

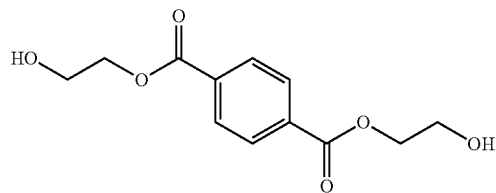 [SMILES: O=C(OCCO)c1ccc(C(=O)OCCO)cc1]

BHEN denotes bis(2-hydroxyethyl) 2,6, naphthalate, which may be represented as

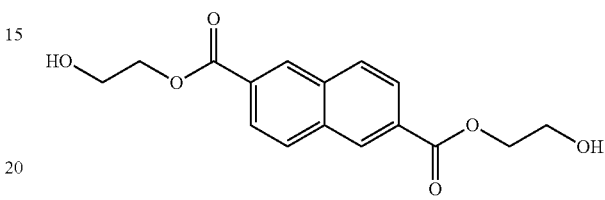

CoPE-AzA (or PE-coAzA) denotes a copolyester of PET or PEN obtained and/or obtainable from EG and at least two acids selected from AzA and either TPA or NDA.

CoPET-AzA (or PET-coAzA) denotes a copolyester of PET obtained and/or obtainable from EG and at least two acids selected from AzA and TPA.

CoPEN-AzA (or PEN-coAzA) denotes a copolyester of PEN obtained and/or obtainable from EG and at least two acids selected from AzA and NDA.

EG denotes ethylene glycol or ethane-1,2-diol, which may be represented as

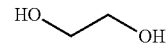

NDA denotes 2,6-naphthalene dicarboxylic acid, which may be represented as

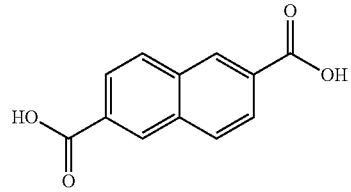 [SMILES: O=C(O)c1ccc2cc(C(=O)O)ccc2c1]

PET denotes polyethylene terephthalate, a polyester polymer which may be made by an esterification reaction to form as an intermediate a mixture comprising oligomers followed by a polycondensation reaction of the oligomer mixture to form the final polymeric mixture that comprises PET. The macromolecules that comprise a PET polymeric mixture may be represented as moieties having the following repeat unit

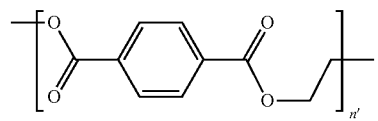

PEN denotes polyethylene naphthalate, a polyester polymer which may be made by an esterification reaction to form as an intermediate a mixture comprising oligomers followed by a polycondensation reaction of the oligomer mixture to form the final polymeric mixture that comprises PEN. The macromolecules that comprise a PEN polymeric mixture may be represented as moieties having the following repeat unit

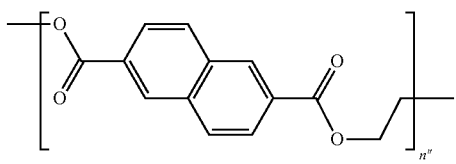

TPA denotes terephthalic acid, which may be represented as

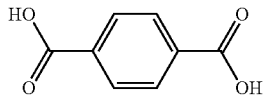 [SMILES: O=C(O)c1ccc(C(=O)O)cc1]

The term 'hydrocarbon radical' as used herein is a sub-set of an organic group and denotes any moiety (optionally attached to one or more other moieties) which consists of one or more hydrogen atoms and one or more carbon atoms and may comprise one or more saturated, unsaturated and/or aromatic moieties. Hydrocarbylene groups comprise divalent groups formed by removing two hydrogen atoms from a hydrocarbon, the free valencies of which are not engaged in a double bond. Hydrocarbon radicals may comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups.

The term 'alkyl' or its equivalent (e.g. 'alk') as used herein may be readily replaced, where appropriate and unless the context clearly indicates otherwise, by terms encompassing any other hydrocarbon group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbon species linking two or more moieties (such as bivalent hydrocarbylene radicals e.g. alkylene).

The term "elevated pressure" preferably means from 2.7 to 3.0 bar, particularly in respect of the esterification steps disclosed herein. The term "atmospheric pressure" means about 1 bar, particularly in respect of the esterification steps disclosed herein. The term "reduced pressure" preferably means no greater than about 1 torr, such as between 0.1 and 1 torr, particularly in respect of the polycondensation step disclosed herein.

Unless the context clearly indicates otherwise, as used herein plural forms of the terms herein are to be construed as including the singular form and vice versa.

The term "comprising" as used herein will be understood to mean that the list following is non exhaustive and may or may not include any other additional suitable items, for example one or more further feature(s), component(s), ingredient(s) and/or substituent(s) as appropriate and/or suitable.

The term "consisting essentially of" as used herein will be understood to mean that the following list is substantially exhaustive so generally substantially comprises the listed component(s) as the substantial component(s) thereof, the list being substantially free of other component(s). Thus for example whilst a small number and/or quantity of other additional and/or suitable items may be foreseen, such items would be present to a limited extent consistent with the definitions of "suitable", "substantially" and/or "substantially-free" as defined further herein.

The term "consisting of" as used herein will be understood to mean that the following list is exhaustive so contains the listed component(s) only and excludes other additional items.

'Major component' (or synonyms thereof) as used herein will be understand to mean an proportion where any additional elements or additives present have no substantial effect on the properties of the component and thus the major component may be present in an amount of at least 50%, preferably at least 60%, more preferably at least 70%, most preferably at least 80%, especially at least 90%, most especially about 99% parts of the relevant whole.

The terms 'effective', 'acceptable' 'active' and/or 'suitable' (for example with reference to any process, use, method, application, preparation, product, material, formulation, compound, monomer, oligomer, polymer precursor, and/or polymers of the present invention and/or described herein as appropriate) will be understood to refer to those features of and/or used on the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

Preferred utility of the present invention comprises one or more of use as a polymeric film suitable for use in applications for which food contact approval is required.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

Thus for example a substance stated as present herein in an amount from 0 to "x" (e.g. in units of mass and/or weight %) is meant (unless the context clearly indicates otherwise)

to encompass both of two alternatives, firstly a broader alternative that the substance may optionally not be present (when the amount is zero) or present only in an de-minimus amount below that can be detected. A second preferred alternative (denoted by a lower amount of zero in a range for amount of substance) indicates that the substance is present, and zero indicates that the lower amount is a very small trace amount for example any amount sufficient to be detected by suitable conventional analytical techniques and more preferably zero denotes that the lower limit of amount of substance is greater than or equal to 0.001 by weight % (calculated as described herein).

PERCENTAGES

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

PERCENTAGES FOR MONOMERS

In the present invention, unless the context clearly indicates otherwise, an amount of an ingredient stated to be present in the composition of the invention when expressed as a weight percentage, is calculated based on the total amount of monomers in the composition being equivalent to 100% (thus for example components (a)+(b)+(c)+(d) total 100%). For convenience certain non-monomer ingredients which fall outside the definitions of any of components (a) to (d) may also be calculated as weight percentages based on total monomer (i.e. where the weight of total monomers alone is set at 100%). As the weight % of monomers (for example for components (a) to (d)) by definition total 100% it will be seen that using monomer based weight % values for the non monomer ingredients (i.e. those components outside (a) to (d)) will mean the total percentages will exceed 100%. Thus amounts of non monomer ingredients expressed as monomer based weight percentages can be considered as providing a ratio for the weight amounts for these ingredients with respect to the total weight of monomers which is used only as a reference for calculation rather than as a strict percentage. Further ingredients are not excluded from the composition when (a)+(b)+(c)+(d) total 100% and weight percentages based on total monomers should not be confused with weight percentages of the total composition.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole.

By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

In a particularly preferred embodiment, the term "substantially free" means that the copolyester contains no more than 2% of extractable oligomer, and particularly no more than 5000 mg extractable oligomer per kg of copolyester. Preferably, the term "substantially free" means that the copolyester contains no more than 4200 mg extractable oligomer per kg of copolyester, preferably no more than 4000 mg, preferably no more than 3500 mg, preferably no more than 3300 mg, preferably no more than 3200 mg, preferably no more than 3000 mg, preferably no more than 2900 mg, preferably no more than 2700 mg.

IMPROVEMENTS/COMPARABLE PROPERTIES OF COPOLYMER COMPARED TO BASE POLYMER

Copolyesters of and/or used in the present invention may also exhibit improved properties with respect to known base polymers that are used in a similar manner Such improved properties may be (preferably as defined below) in at least one, preferably a plurality, more preferably three of more of those propert(ies) labeled 1 to 3 below. Preferred copolyesters of and/or used in the present invention, may exhibit comparable properties (compared to known base copolyesters and/or components thereof) in one or more, preferably two or more, more preferably three or more of those properties labelled 1 to 3 below.
1. Reduced amount of components with a molecular weight less than 2000 daltons, preferably 1000 daltons, more preferably 500 daltons, extractable from the copolyester (compared to the base polyester) by dissolving in an organic (e.g. THF, chloroform, xylene and/or ethanol, preferably ethanol) solvent under standard conditions.
2 Mechanical properties namely resistance to elongation of a film made from the copolyester (compared to the base polyester).
3 Optical properties namely transparency to visible radiation of a film made from the copolyester (compared to the base polyester).

The weight percentages in parameters are calculated with respect to initial weight of the component.

Improved properties as used herein means the value of the component and/or the composition of and/or used in the present invention is >+8% of the value of the known reference component and/or composition described herein, more preferably >+10%, even more preferably >+12%, most preferably >+15%.

Comparable properties as used herein means the value of the component and/or composition of and/or used in the present invention is within +/−6% of the value of the known reference component and/or composition described herein, more preferably +/−5%, most preferably +/−4%.

The percentage differences for improved and comparable properties herein refer to fractional differences between the component and/or composition of and/or used in the invention and the known reference component and/or composition described herein where the property is measured in the same units in the same way (i.e. if the value to be compared is also measured as a percentage it does not denote an absolute difference).

EMBODIMENTS

It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination. Many other variations embodiments of the invention will be apparent to those skilled in the art and such variations are contemplated within the broad scope of the present invention.

Generally to number elements shown in the FIGURES herein, unless the context clearly indicates otherwise, the same, similar or analogous elements are given the same numbers as labels separated by integral (or no) multiples of hundred and so the purpose of each element need not be described repeatedly herein but can be inferred by analogy.

Further aspects of the invention and preferred features thereof are given in the claims herein.

FIGURE

The invention is illustrated by the following non-limiting FIGURE where:

FIG. 1 shows a schematic representation (Scheme 1) of an embodiment of the process of the invention.

The copolyester of comparative example A was synthesized by mixing all of the monomers (ethylene glycol, terephthalic acid and azelaic acid) into a single batch, esterified under elevated pressure (about 3 bar), followed by polycondensation (step (d)).

The copolyester of example 1 was synthesized by reacting firstly ethylene glycol with terephthalic acid to form BHET (step (a)) under elevated pressure, and then adding azelaic acid and ethylene glycol (step (b)) in the vessel under atmospheric pressure (about 1 bar), followed by polycondensation (step (d)) under reduced pressure (<1 torr). Both comparative example A and example 1 ran well.

The copolyesters of examples 2 to 4 were synthesized by reacting azelaic acid with ethylene glycol to give BHEA (step (a)) and then undergoing transesterification of BHEA with BHET (step (c)), followed by polycondensation (step (d)). The transesterification was carried out under the varied pressure conditions as shown in Table 1.

For each of comparative example 1 and examples 1 to 4, the polycondensation step (d) was carried out with a TiPT catalyst at an active catalyst level of 42 ppm under reduced pressure (<1 torr), at the temperatures and for the duration shown in Table 1.

TABLE 1

| Ex. | Esterification pressure | Esterification cycle time (mins) | PC Temp (° C.) | PC cycle time (mins) | Average $M_n$ (g/mol) | Average IV (dL/g) | Total oligomer conc. (mg/kg material) |
|---|---|---|---|---|---|---|---|
| Comp A | Elevated | 126 | 260 | 235 | 13100 | 1.04 | 4360 |
| 1 | Elevated (step (a)) then atmospheric (step (b)) | 124 | 263 | 187 | 17850 | 1.63 | 4071 |
| 2 | Elevated (steps (a) and (c)) | 66 | 260 | 210 | 5500 | 0.49 | 2850 |
| 3 | Elevated (step (a)) then atmospheric (step (c)) | 94 | 286 | 74 | 17300 | 1.39 | 2527 |
| 4 | Atmospheric (steps (a) and (c)) | 85 | 282 | 64 | 16300 | 1.43 | 2085 |

EXAMPLES

The present invention will now be described in detail with reference to the following non limiting examples provided to further illustrate the processes and compositions of the present invention. These examples are illustrative only and are not intended to limit the scope of the invention in any way. Unless otherwise specified all parts, percentages, and ratios are on a weight basis. The prefix C or COMP before an example indicates that it is comparative.

Various registered trademarks, other designations and/or abbreviations are used herein to denote some of ingredients used to prepare polymers and compositions of the invention. These are identified below by chemical name and/or trade name and optionally their manufacturer or supplier from whom they are available commercially. However where a chemical name and/or supplier of a material described herein is not given it may easily be found for example in reference literature well known to those skilled in the art.

Comparative Example A and Examples 1 to 4

Five coPET-AzA copolyesters were prepared. The process conditions used in each example varied, as shown in Table 1. The copolyesters were analysed by GC-quadrupole mass spec. The total oligomer concentration in the copolyester was determined, as shown in Table 1.

The polydispersity of Comparative Example A was determined to be 2.6. The polydispersity of Example 2 was determined to be 2.1.

The data in Table 1 demonstrates that the copolyesters produced by the process of the invention exhibit reduced amounts of oligomers compared to copolyesters produced by direct polymerisation of all of the starting monomers (i.e. comparative example A) without proceeding via ester interchange step (b) or step (c). Furthermore, the data in Table 1 demonstrates that copolyesters produced by a process comprising step (c) exhibit significantly reduced amounts of oligomers compared to copolyesters produced by a process comprising step (b).

The polycondensation step of Example 2 was performed at 260° C., similarly to Comparative Example A and Example 1. Although the copolyester formed in Example 2 had an undesirably low molecular weight, the copolyester exhibited a significantly reduced amount of oligomeric extractables compared to Comparative Example A and Example 1.

The polycondensation step of Examples 3 and 4 was performed at 286° C. and 283° C. respectively. Furthermore, the transesterification step of Examples 3 and 4 was performed partially or completely under atmospheric pressure conditions. The copolyesters of Examples 3 and 4 demonstrated excellent properties, particularly in comparison with Example 2 wherein the polycondensation step was performed at 260° C. and the esterification step was performed completely under elevated pressure conditions. Thus, these examples indicate that the esterification steps (a) to (c) of the present invention can be conducted partially or completely under atmospheric pressure conditions, such that an elevated pressure is advantageously not required. Furthermore, these examples indicate that the polycondensation step (step (d)) of the present invention can be conducted at a high temperature and that both the esterification steps (a) to (c), and polycondensation step (d), have an advantageously short residence time.

It is taught in literature that increased residence time leads to increased oligomers. The process described in the present application surprisingly overcomes this problem because copolyesters with a suitable molecular weight can be obtained with a short residence time and therefore with a reduced oligomer content.

In general, the molecular weight (GPC data) observed for the copolyesters was in accordance with the calculated IV values, because a positive correlation was observed between the IV values and the molecular weight (Mw).

Three fragmentation patterns were identified in the oligomer content. These patterns comprise the majority of oligomers formed (that are subsequently extracted prior to GC-MS):

$$m/z\ 152.084 + 98.093 + 124.088$$
$$m/z\ 99.046 + 385.222 + 215.128$$
$$m/z\ 237.076 + 152.084 + 149.024$$

Without wishing to be bound by any theory the applicant believes that cyclic oligomers are responsible for three main observed fragmentation patterns in the solvent extracts from the copolyesters of the examples and it is also believed that these are formed via reaction of AzA with EG-species.

Without wishing to be bound by any mechanism, the inventors have deduced from analytical data that there are two main variables that may particularly affect the rate of formation of oligomer impurities during copolymerization of, for example, coPET-AzA copolymers.

Firstly, the order of addition of the reagents may be important to reduce the degree of impurities in the final copolyester. GC-MS analysis suggests that the main cyclic oligomers formed originate from the reaction of AzA with EG end-groups. The Examples demonstrate that the addition of BHET to BHEA (step (c)) during the esterification step will reduce the total amount of oligomers formed, in comparison to the processes where either BHET+AzA+EG (step (b)) or TPA+EG+AzA (comparative) are instead reacted together in the esterification step.

Secondly, the reaction time or residence time of the copolymer in the reaction vessel can be reduced by monitoring the polycondensation until a specific intrinsic viscosity has been reached and then quenching the reaction and removing the copolymer. A positive correlation has been observed between extractable oligomers and residence time. Thus, an alternative solution to reduce total oligomer content may involve a reduction in residence time by finishing the polycondensation reaction earlier that has been done heretofore, for example by producing copolymers having defined intrinsic viscosity (IV). Another solution may be to increase the polymerization temperature.

In conclusion, the applicant has prepared pilot-plant scale batches of copolyester (coPET-AzA) where changing the reagents and the order of their addition to BHEA+BHET and increasing the polycondensation temperature to 285-290° C. (from 255-260° C. used to prepare copolymers previously) and/or monitoring the IV of the copolymer being produced resulted in a reduction in polycondensation time from 3.5 hours to 1.25 hours.

The reaction product was characterized by GPC and GC-MS data. GC-MS denotes gas chromatography mass spectrometry and GPC gel permeation chromatography.

Test Methods a) Molecular Weight

GPC measurements were performed on a Malvern/Viscotek TDA 301 using an Agilent PL HFIPgel guard column plus 2×30 cm PL HFIPgel columns. A solution of HFIP with 25 mM NaTFAc was used as eluent, with a nominal flow rate of 0.8 mL min$^{-1}$. All experimental runs were conducted at 40° C., employing a refractive index detector with differential pressure/viscosity and right-angle light scattering. Molecular weights are referenced to a single PMMA calibrant of known molecular weight and concentration. Data capture and subsequent data analysis were carried out using Malvern/Viscotek Omnisec software. Samples were prepared at a concentration of 2 mg mL$^{-1}$, with 20 mg of sample dissolved in 10 mL eluent. These solutions were stirred for 24 h at room temperature and then warmed at 40° C. for 30 mins to fully dissolve the polymer. Each sample was filtered through a 0.45 μm PTFE membrane prior to injection.

b) Oligomer Content

The total amount and composition of oligomers present in polymer resins were determined by GC-QTOF-MS/FID, following specific migration in solvent. Approximately 10 g of polymer resin was refluxed in 95% ethanol for 8 hours, as according to Commission Regulation (EU) No 10/2011 and EN 1186. The resultant migration solution was concentrated and analysed using a GC-QTOF-MS/FID screening method (PTV injection, DB-5 column and electron impact ionisation). The reported concentrations were calculated with the averaged response of the added internal standards IS 1: heptadecane (CAS 629-78-7), IS 3: benzylbutyl phthalate-D4 (CAS 93951-88-3), IS 4: di-n-nonyl phthalate-3,4,5,6-D4 (CAS 1202865-43-7).

As used herein, unless the context indicates otherwise, standard conditions (e.g. for conducting measurements) means a relative humidity of 50%±5%, ambient temperature (23° C.±2°) and an air flow≤(less than or equal) to 0.1 m/s.

(c) Intrinsic Viscosity (in units of dL/g) of the polyester and polyester film is measured by solution viscometry in accordance with ASTM D5225-98(2003) on a Viscotek™ Y-501C Relative Viscometer (see, for instance, Hitchcock, Hammons & Yau in *American Laboratory* (August 1994) "The dual-capillary method for modern-day viscometry") by using a 0.5% by weight solution of polyester in o-chlorophenol at 25° C. and using the Billmeyer single-point method to calculate intrinsic viscosity:

$$\eta = 0.25\eta_{red} + 0.75(\ln\eta_{rel})/c$$

wherein:
$\eta$=the intrinsic viscosity (in dL/g),
$\eta_{rel}$=the relative viscosity, c=the concentration (in g/dL), &

$\eta_{red}$=reduced viscosity (in dL/g), which is equivalent to $(\eta_{rel}-1)/C$ (also expressed as $\eta_{sp}/c$ where $\eta_{sp}$ is the specific viscosity).

The invention claimed is:

1. A process for preparing a copolyester comprising repeating units derived from (i) at least one aliphatic glycol, (ii) at least one aromatic dicarboxylic acid, and (iii) at least one aliphatic dicarboxylic acid, wherein the aliphatic dicarboxylic acid constitutes a proportion of the acid fraction of the copolyester; and wherein the process comprises the steps of:

(a) reacting in an esterification reaction said at least one aliphatic glycol (i) with a dicarboxylic acid selected from said at least one aromatic dicarboxylic acid (ii) or said at least one aliphatic dicarboxylic acid (iii) to form an ester of the respective acid(s);

(b) adding, to a reaction vessel comprising the ester obtained from step (a), an ester which is different from the ester obtained from step (a), said different ester being selected from the ester of said aromatic dicarboxylic acid (ii) or the ester of said aliphatic dicarboxylic acid (iii), wherein said different ester has been formed outside the reaction vessel;

(c) reacting in an ester interchange reaction (e.g. a transesterification), the ester obtained from step (a) with the different ester added in step (b);

wherein step (c) comprises reacting a bis(hydroxyalkyl)-ester of the aromatic dicarboxylic acid (ii) with a bis(hydroxyalkyl)-ester of the aliphatic dicarboxylic acid (iii).

2. A process for preparing a copolyester comprising repeating units derived from (i) at least one aliphatic glycol, (ii) at least one aromatic dicarboxylic acid, and (iii) at least one aliphatic dicarboxylic acid, wherein the aliphatic dicarboxylic acid constitutes a proportion of the acid fraction of the copolyester, and wherein the aliphatic dicarboxylic acid is azelaic acid;

wherein the process comprises the steps of:

(a) reacting in an esterification reaction said at least one aliphatic glycol (i) with said azelaic acid (iii) to form a bis(hydroxyalkyl)-ester of azelaic acid;

(b) optionally reacting in an ester interchange reaction the ester obtained from step (a) with a further dicarboxylic acid from which the ester used in step (b) is not derived, said further dicarboxylic acid being selected from said aromatic dicarboxylic acid (ii); or (c) optionally reacting in an ester interchange reaction (e.g. a transesterification), the ester obtained from step (a) with a further ester which is different from the ester obtained from step (a), said further ester being selected from the ester of said aromatic dicarboxylic acid (ii);

wherein one of steps (b) and (c) are present.

3. A process for preparing a copolyester comprising repeating units derived from (i) at least one aliphatic glycol, (ii) at least one aromatic dicarboxylic acid, and (iii) at least one aliphatic dicarboxylic acid, wherein the aliphatic dicarboxylic acid constitutes a proportion of the acid fraction of the copolyester; and wherein the process comprises the steps of:

(a) reacting in an esterification reaction said at least one aliphatic glycol (i) with a dicarboxylic acid selected from said at least one aromatic dicarboxylic acid (ii) or said at least one aliphatic dicarboxylic acid (iii) to form an ester of the respective acid(s);

(b) optionally reacting in an ester interchange reaction the ester obtained from step (a) with a further dicarboxylic acid from which the ester used in step (b) is not derived, said further dicarboxylic acid being selected from said aromatic dicarboxylic acid (ii) or said aliphatic dicarboxylic acid (iii); or (c) optionally reacting in an ester interchange reaction (e.g. a transesterification), the ester obtained from step (a) with a further ester which is different from the ester obtained from step (a), said further ester being selected from the ester of said aromatic dicarboxylic acid (ii) or the ester of said aliphatic dicarboxylic acid (iii);

wherein one of steps (b) and (c) are present; and (d) a polycondensation step to form the copolyester, wherein the polycondensation is performed at a temperature of from 285° C.

4. A process according to claim 1, wherein the aromatic dicarboxylic acid (ii) is selected from terephthalic acid, isophthalic acid, naphthalene-dicarboxylic acid, isomers thereof and mixtures thereof.

5. A process according to claim 1, wherein the aromatic dicarboxylic acid (ii) is selected from terephthalic acid and naphthalene-dicarboxylic acid.

6. A process according to claim 1, wherein the aliphatic dicarboxylic acid (iii) is selected from $C_{4-20}$ aliphatic dicarboxylic acids.

7. A process according to claim 1, wherein the aliphatic dicarboxylic acid (iii) is azelaic acid.

8. A process according to claim 1, wherein the aliphatic glycol (i) is selected from selected from $C_2$, $C_3$ and $C_4$ aliphatic diols.

9. A process according to claim 1, wherein the aliphatic glycol (i) is ethylene glycol.

10. A process according to claim 2, wherein step (c) is present.

11. A process according to claim 1, wherein step (a) comprises reacting the aliphatic glycol with the dicarboxylic acid selected from said at least one aromatic dicarboxylic acid (ii) or said at least one aliphatic dicarboxylic acid (iii) to form a bis(hydroxyalkyl)-ester of said dicarboxylic acid.

12. A process according to claim 2, wherein step (c) comprises reacting a bis(hydroxyalkyl)-ester of the aromatic dicarboxylic acid (ii) with a bis(hydroxyalkyl)-ester of the aliphatic dicarboxylic acid (iii).

13. A process according to claim 1, wherein the bis(hydroxyalkyl)-ester of the aromatic dicarboxylic acid (ii) is selected from bis(hydroxyethyl)-terephthalate or bis(hydroxyethyl)-naphthalate.

14. A process according to claim 12 wherein the bis(hydroxyethyl)-ester of the aliphatic dicarboxylic acid (iii) is selected from a bis(hydroxyethyl)-ester of an $C_{6-10}$ aliphatic diacid, for example bis(2-hydroxyethyl) azelate.

15. A process according to of claim 1, wherein the reaction is performed at a temperature of from about 140° C. to about 265° C.

16. A process according to of claim 1, wherein the reaction is performed in the presence of a base.

17. A process according to claim 1, wherein the process further comprises a polycondensation step (d).

18. A process according to claim 1, wherein the copolyester is substantially free of any oligomeric impurities formed by a side reaction of any of the glycol component(s) (i) with the aliphatic acid(s) (iii).

19. A process according to claim 1, wherein the bis(hydroxyethyl)-ester of the aliphatic dicarboxylic acid (iii) is represented by Formula (IIA):

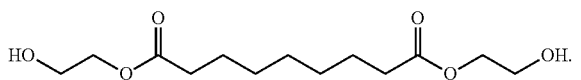

(IIA)

20. A process according to claim 1, wherein steps (a), (b) and/or (c) (where present) are performed sequentially in different reaction vessels or simultaneously in the same reaction vessel.

21. A process according to claim 20 in which steps (a), (b) and/or (c) (where present) are performed in the same reaction vessel under the same reaction conditions.

22. A process according to claim 1, wherein step (c) is the transesterification of bis(hydroxyethyl)-terephthalate or bis (hydroxyethyl)-naphthalate with bis(2-hydroxyethyl) azelate.

23. A process according to claim 17, wherein step (d) is performed at a temperature from about 255 to about 310° C.

24. A process according to claim 1, wherein steps (a), (b) and/or (c) (where present) are partially or completely performed under atmospheric pressure.

25. A process according to claim 24, wherein step (b) and/or (c) (where present) are performed under atmospheric pressure.

26. A process according to claim 25, wherein steps (a), (b) and (c) (where present) are performed under atmospheric pressure.

27. A process according to claim 17, wherein, in step (d), the intrinsic viscosity (IV) of the copolymer being produced is measured and the reaction is stopped and/or the copolymer is removed from the reaction vessel when a predefined intrinsic viscosity (IV) value has been reached.

28. A process according to claim 1, wherein a residence time in a reaction vessel for either or each of the reagents in steps (a) and (c) is less than about 3 hours.

29. A process according to claim 17, wherein a residence time in a reaction vessel for the reagents in step (d) is from about 1 to about 4 hours.

\* \* \* \* \*